United States Patent [19]

Schreiber

[11] Patent Number: 5,040,211
[45] Date of Patent: Aug. 13, 1991

[54] RELIABLE TELEVISION TRANSMISSION THROUGH ANALOG CHANNELS

[75] Inventor: William F. Schreiber, Cambridge, Mass.

[73] Assignee: Massachusetts Institute of Technology, Cambridge, Mass.

[21] Appl. No.: 257,402

[22] Filed: Oct. 13, 1988

[51] Int. Cl.$^5$ .......................................... H04N 7/167
[52] U.S. Cl. ........................................ 380/14; 380/10
[58] Field of Search .................................. 380/10, 14

[56] References Cited

U.S. PATENT DOCUMENTS

| | | | |
|---|---|---|---|
| 3,859,457 | 1/1975 | Kirk, Jr. ................................ | 380/10 |
| 4,058,836 | 11/1977 | Drewery et al. ..................... | 358/167 |
| 4,074,311 | 2/1978 | Tanner et al. ........................ | 380/10 |
| 4,389,671 | 6/1983 | Posner et al. ........................ | 380/10 |
| 4,405,942 | 9/1983 | Block et al. .......................... | 380/10 |
| 4,602,283 | 7/1986 | Corgnier et al. ..................... | 380/10 |
| 4,605,961 | 8/1986 | Frederiksen ......................... | 380/10 |
| 4,607,285 | 8/1986 | Hirota et al. ........................ | 358/167 |
| 4,618,893 | 10/1986 | Hirota et al. ........................ | 358/167 |
| 4,630,112 | 12/1986 | Yamada et al. ...................... | 380/10 |
| 4,654,704 | 3/1987 | Lippel ................................... | 380/10 |
| 4,669,117 | 5/1987 | Van Eck ............................... | 380/10 |
| 4,821,097 | 4/1989 | Robbins ............................... | 380/10 |

OTHER PUBLICATIONS

Ciciora et al., "A Tutorial on Ghost Cancelling in Television Systems", IEEE Transactions on Consumer Electronics, vol. CE-25, Feb. 1979, pp. 9-44.

P. C. Goldmark, "A Technique for Improving the Sharpness of Television Pictures", Proceedings of the I.R.E., Oct. 1951, pp. 1314-1322.

Dubois et al., "Noise Reduction in Image Sequences Using Motion-Compensated Temporal Filtering", IEEE Trans. on Communications, vol. COM-32, Jul. 1984, pp. 826-831.

Martinez et al., "Implicit Motion Compensated Noise Reduction of Motion Video Scenes", reprinted from ICASSP-IEEE International Conference on Acoustics, Speech and Signal Processing, Mar. 26-29, 1985, pp. 375-378.

Zenith Electronics Corporation, "Spectrum Compatible HDTV Systems", Sep. 1, 1988.

Schreiber et al., "Channel-Compatible 6-MHz HDTV Distribution Systems", SMPTE Nashville, Jan. 29, 1988, pp. 1-20.

R. W. Lucky, "Automatic Equalization for Digital Communication", The Bell System Technical Journal, vol. XLIV No. 4, Apr. 1965, pp. 547-558.

L. G. Roberts, "Picture Coding Using Pseudo-Random Noise", IEEE Trans. on Information Theory, Feb. 1962, pp. 145-154.

(List continued on next page.)

Primary Examiner—Thomas H. Tarcza
Assistant Examiner—David Cain
Attorney, Agent, or Firm—Fish & Richardson

[57] ABSTRACT

The presence of random noise, interference, multipath, and imperfect frequency response in terrestrial broadcasting channels, and of pervasive low-level reflections in cable systems, degrades the quality of television reception. These effects tend to reduce the difference in quality between that of NTSC and that of various advanced television systems, as actually delivered to the home via such channels. Several methods are disclosed for dealing with these effects, and thus to preserve the improved quality made possible by currently proposed EDTV and HDTV systems. Automatic channel equalization is used for first-order correction of multipath and frequency distortion. A scrambling method is described that transforms all remaining degradations to additive random noise, which, for a given noise power, is of minimum visibility. Random noise, whether additive or produced by scrambling of other defects, is suppressed by adaptive modulation. If the channel SNR is high enough, some digital data can be transmitted in addition to the analog data by a method called "data under". The methods are applied to a receiver-compatible system that utilizes a very low-power 3-MHz augmentation channel as well as to a bandwidth-efficient 6-MHz system that is not receiver compatible. One version of the latter system can be operated at such low SNR that it may be possible to utilize the taboo channels.

19 Claims, 2 Drawing Sheets

Glenn et al., "High Definition Television Compatible Transmission System", IEEE Trans. on Broadcasting, vol. BC-33, No. 4, Dec. 1987, pp. 107–115.

Philips Laboratories, "Hierarchical High Definition Television System Compatible with the NTSC Environment", Sep. 1987, pp. 1–30.

Butera, "Multiscale Coding of Images", Masters Thesis for Massachusetts Institute of Technology, Sep. 1988, pp. 1–92.

W. Schreiber, patent application entitled, "Improved Definition Television Systems", U.S. Ser. No. 149,673, Jan. 28, 1988.

Schreiber, patent application entitled, "Adaptive Frequency Modulation", U.S. Ser. No. 061,140, dated Jun. 10, 1987.

Martinez, "Model-Based Motion Estimation and its Application to Restoration and Interpolation of Motion Pictures", Doctoral Thesis for Massachusetts Institute of Technology, Aug. 1986.

RELIABLE TELEVISION TRANSMISSION THROUGH ANALOG CHANNELS

BACKGROUND OF THE INVENTION

This invention relates to transmission of television signals through analog channels, and to analog recording of such signals.

Analog channels for television transmission include terrestrial transmission in the VHF and UHF bands, coaxial cable, satellite transmission, and fiber-optic cable in the analog mode. Analog recording systems include tape, disk, etc. In all of these media, the received signal usually suffers loss of quality due to random noise, interference from other transmissions, multipath (echoes), and frequency distortion. This is so much the case that in broadcast television, for example, the image quality seen on home receivers is vastly reduced as compared with that produced in the studio. Reducing or eliminating these effects is especially important in high-definition TV, since channel defects might easily negate the higher resolution of which these systems are capable.

In terrestrial broadcasting, the signal-to-noise ratio (SNR) in the image is a function of the effective transmitted power, the spacing between transmitter and receiver, the effectiveness of the receiver antenna, and the quality of the circuitry in the tuner. All of these factors are limited by economics. Interference relates to the spacing between transmitters, to the antenna, and to the selectivity of the receiver circuitry. It is desired to have as many stations as possible, and the other factors are again limited by economics. Echoes due to multipath conditions can be alleviated by expensive antennas, and so are also governed by economic considerations. The channel frequency response is a function of transmitter and receiver filters, antenna characteristics, and the quality of the tuner circuitry, again economically limited.

In cable, SNR is determined by cable loss as compared with amplifier power and spacing. The pervasive microreflections result from improper terminations. The channel frequency response is affected by limitations similar to those found in broadcasting.

In principle, automatic equalizers can be used in receivers for the purpose of reducing echoes and frequency distortion. W. Ciciora et al., "Automatic Ghost Cancellation in Television Systems," IEEE Trans. on Consumer Electronics, Vol. 25, No. 1, Feb. 1979, pp. 9-54. Some noise reduction is possible using frame-recursive temporal filters, although these are rather expensive for consumer use. J. Drewery et al., U.S. Pat. No. 4,058,836. Another method of noise reduction that is quite simple is called coring. P. C. Goldmark et al., "A New Technique for Improving the Sharpness of Television Pictures," Proc. IRE, Vol. 39, No. 10, Oct. 1951, pp. 1314-1322. It is used in VCR's but produces considerable distortion. More sophisticated methods have been widely studied in the laboratory, but have not been applied to practical TV transmission because of cost and limited effectiveness. E. Dubois et al., "Noise Reduction in Image Sequences," IEEE Trans. on Communications, Vol. 32, No. 7, July 1984, pp. 502-522. D. Martinez et al., "Implicit Motion Compensated Noise Reduction of Motion Video Scenes," IEEE Proc. Intl. Conf. on Acoustics, Speech, and Signal Processing, Mar. 26, 1986, pp. 375-378. Some noise-reduction methods are employed in tape recorders. See U.S. Pat. Nos. 4,607,285; 4,618,393; and 4,007,483.

An additional factor not always considered in rating television systems is interference performance—both the degree of interference caused in other signals and the ability of the signal to deal with interference received from other signals. Improvements in interference response would permit closer transmitter spacing. "Spectrum Compatible HDTV System," Zenith Electronics Corp., Glenview, Ill., Sept. 1, 1988.

My pending application, hereby incorporated by reference, U.S. Ser. No. 149,673, filed Jan. 28, 1988, entitled "Improved Definition Television Systems," describes a technique known as subband coding. In this class of methods, the 3-dimensional spectrum of the video signal produced by a high-quality camera is divided into spatiotemporal components. Each component is selected by a filter, preferable separable. That means that a cascade of three 1-dimensional filters—vertical, horizontal, and temporal—is employed. The components are time-multiplexed for transmission, each component being independently processed, for example by a static nonlinear amplifier and by an adaptive modulator. W. F. Schreiber et al., "Channel-Compatible 5-MHz HDTV Distribution System," Presented at SMPTE Conference, Nashville, Jan. 29, 1988. At the receiver, each component is demodulated and then all the components are added up to produce the reconstructed video signal. The advantage of this technique is that the perceptually more important components can be used for transmission, adaptively selected, if desired, and each component can be treated appropriately according to how it is perceived.

My copending application, also incorporated by reference, U.S. Ser. No. 61,140, filed on June 10, 1987, entitled "Improved Transmission of Signals Through Analog Channels Using Adaptive Frequency Modulation", describes improvements in quality obtainable with adaptive modulation. It is the nature of television images that they consist of objects of varying sizes, mostly much larger than a single picture element (pel). Thus, most of the pels in an image are located in the interior of objects and many fewer at the edges, where the video signal changes substantially from pel to pel. The human visual system is much more sensitive to noise in the relatively blank areas within objects than in the busy areas at the edges of objects or where there is a great deal of fine detail. It is just in these relatively blank areas where all the signal components (except the one containing the dc level and the low spatiotemporal frequencies) are quite small. These small signals can be greatly increased for transmission and correspondingly reduced (along with the noise) at the receiver. Adaptive modulation thus greatly reduces the noise of whatever origin in just those areas where it would be most visible. The efficacy of adaptive modulation is highest for those signals that are very small in the blank areas—namely the high-frequency signals. The dc and low-frequency RGB signals (or the luminance/chrominance signals, in an L/C system) do not have this property.

It is well known that noise of all kinds can be essentially eliminated in most cases by digital transmission. This is used in some fiber-optic transmission lines and in certain disk-recording systems. It is not used for normal TV transmission because it requires a very large increase in channel bandwidth.

Frequency modulation is another method of improving SNR by using a wider bandwidth. It is used in satellite transmission, where wide bandwidths are available. A narrow-band form of FM is also used in magnetic video recording to reduce the effect of unwanted changes in signal level. It is not used in normal TV transmission because of the wide bandwidth required.

SUMMARY OF THE INVENTION

In general the invention features, in a first aspect, pseudorandomly scrambling the order in which individual picture elements of a television signal are transmitted. In preferred embodiments, the signal is spectrally divided (spatially or spatiotemporally) into at least one low-frequency component and at least one high-frequency component, and scrambling is performed on only the high-frequency component; low-frequency components are transmitted digitally or by frequency modulation; adaptive modulation is performed on the high-frequency component prior to scrambling to give greater relative amplification to the signal in blank areas of the image; different pseudorandom sequences are used for successive image frames; horizontal and vertical picture element addresses are independently scrambled using independent pseudorandom sequences; the high frequency components comprise a plurality of spatiotemporal components; and the channel across which signals are transmitted is adaptively equalized.

In a second aspect, the invention features discriminating against frequency distortion in a television signal by pseudorandomly scrambling the transmitted signal before transmission and descrambling the received signal.

In a third aspect, the invention features improving the SNR of a transmitted television signal by transmitting the high-frequency components by adaptive modulation and the low-frequency components by a method that exchanges greater bandwidth for improved SNR (e.g., digital transmission or frequency modulation).

In a fourth aspect, the "data-under" method is used to transmit the low and high-frequency components of a television signal. The high-frequency components are transmitted as analog signals, using adaptive modulation, on top of the digital transmission of the low-frequency components. In preferred embodiments, audio and data signals are also transmitted digitally, combined with the low-frequency components.

In some preferred embodiments, information for augmenting ordinary NTSC transmissions sent over existing channels is transmitted over "taboo" channels in the form of low-power, high-frequency signals. A "taboo" channel is one that cannot be used at present in a given city because of interference with existing NTSC stations.

The invention embodies several important techniques:

Scrambling: If an image is stored in digital form at both transmitter and receiver, which is likely to be the norm in advanced television systems, then transmission can be thought of as reading the contents from the transmitter store and replicating them in the receiver store. Conventional normal transmission would involve reading out the data pel by pel and line by line, in the usual raster scan format and recording it in the corresponding storage locations in the receiver. The invention substitutes a pseudorandom order for the conventional raster scan. Each storage location is read exactly once during the period devoted to transmitting one frame, and the identical pseudorandom sequence is used at both transmitter and receiver storage locations to assure accurate transmission. Once the image is entered into the receiver store, it can be read out in conventional, raster format to produce a normal video signal for display on the picture tube.

The effect of scrambling is to disperse echoes as random noise. Since successive samples in the transmitted signal do not represent adjacent pels in the image, echo samples are dispersed to random locations, and thus appear as additive random noise and not as shifted images. The rms value of the resulting noise is simply the rms value of the echo, which may be considerable. Therefore, this technique works best with the high-frequency components, which have quite low power.

Frequency distortion is also dispersed as random noise. Echoes can be modeled as a result of linear filtering, and since scrambling disperses echoes, it also disperses the effects of any other linear filtering operation such as frequency distortion. The latter can be thought of as having the effect of spreading some of the energy from each picture element into neighboring pels. This reduction in value of the current pel and a corresponding change in value of nearby pels can be thought of as a localized noise or close-in echo. With scrambling, the pels into which the energy is spread are not neighbors, but are randomly located in the image. Thus, the effect of scrambling on a signal transmitted through a channel whose frequency response is not perfect is to produce a noisy signal completely free of frequency distortion. If there were a great deal of distortion, the noise would be unacceptable. However, applied to the highs signals that have low average power, and used with an adaptive equalizer that partially corrects the channel distortion, scrambling completely eliminates the remaining distortion with acceptable noise level.

Interference from other signals is also dispersed as random noise. It is clear that any noise is rando by scrambling. This greatly decreases the visibility of interference from other video signals. In addition, each scrambled signal looks like noise to all other signals, scrambled or not, while, to an unscrambled signal, a scrambled signal looks like noise—both highly favorable results.

Scrambling Combined with Adaptive Modulation: Combining scrambling with adaptive modulation produces a remarkable result. The dispersed random noise achieved by scrambling is attenuated in blank areas, where the noise otherwise would be most visible.

This remarkably beneficial result comes about because, in typical pictures, there are many more pels in relatively blank areas than associated with edges or areas of high detail. A typical pel is multiplied by one adaptation factor at the encoder and divided by another at the decoder. For pels in the main image, these factors are identical, so that there is no change; only the additive channel noise is reduced. For pels in the scattered echo, the first factor is small (near unity) for edge pels and large for blank-area pels. For pels that end up in blank areas, the second factor is large, while for those that end up in busy areas, the second factor is small. The most important case is that of the edge pels that are scattered into the blank areas; those are greatly reduced in amplitude. Thus, the energy in the scattered echo is greatly reduced as well as randomized. There is some increase in noise in the busy areas, but here its visibility is partially masked. The same beneficial result is achieved for frequency distortion and signal interference. Errors from distortion and signal interference end up, for the most part, in blank areas of the image, where they are attenuated.

When it is permissible to transmit at about 12 db higher signal level than required for the highs components above, the data-under method can be used to transmit a 2-level digital signal in addition to the highs information. This could usefully be used for digital audio and data.

Adaptive Equalization: Adaptive equalization, first widely used for digital transmission in telephone lines, R. W. Lucky, "Automatic Equalization for Digital Communication," Bell System Tech. J., Vol. 44, No. 4, Apr. 1965, pp. 547–588, and considered for advanced television systems, works particularly well in combination with other features of the invention. It helps reduce frequency distortion to where, as a practical matter, the effects of such distortion can be completely eliminated by scrambling, particularly when combined with adaptive modulation.

The general idea is to transmit, along with the video signal, a test signal that is used to measure the channel frequency response. A correcting filter is then automatically derived to make a best-possible correction, according to some criterion that normally would be concerned both with frequency response and SNR. Echoes due to multipath transmission can be modelled as frequency distortion, so that automatic equalizers also correct for echoes as long as the impulse response of the correcting filter has a long enough extent in time to encompass the echoes. Another channel degradation that can readily be corrected is nonlinear distortion. For this purpose a step signal comprising perhaps 16 levels ranging from zero to some maximum value is transmitted once per frame. The values of these levels as received are measured and a compensating nonlinearity computed and impressed on the received signal.

The "Data-Under" Method: The higher-frequency components of a video signal do not require as high a SNR at the receiver as do the lower-frequency components. With carrier-to-noise ratio (CNR) values high enough to produce good pictures in NTSC—40db or so—adaptive modulation results in excess SNR for these components. In that case, it is possible to take advantage of the excess channel capacity by transmitting additional information. One way to do this is to add one of the highs components, reduced in amplitude by a suitable amount, "over" a multilevel digital signal. For example, if the digital signal to be placed "under" the analog highs signal has four levels, the analog signal must be reduced by a factor of at least four in order to fit between two adjacent levels of the quantized signal. In that case, the under signal transmits 2 bits per sample and the analog signal is decreased in SNR by 12 db. Actually, some room must be left for channel noise. For example, if noise equal to ½ level is to be accommodated, the analog signal must be reduced by a factor of 8, or 18 db. If the under signal has two levels, or one bit/sample, and noise equal to ½ level is to be accommodated, then the analog SNR is reduced 12 db.

Since the most important parts of the signal to be protected against degradation are the audio, the low-frequency components, and data, the "data-under" method can advantageously be used to get the best possible performance under a variety of channel conditions. In this method, these three components are digitized and transmitted as the "under" signal, while all of the highs components are reduced in amplitude and transmitted as the "over" signals. In this way, the full channel bandwidth is available for highs signals. Under extremely poor channel conditions, the highs components can be discarded and the picture made up only of the said three components, which would still give acceptable results.

The amount of extra data that can be transmitted by the "data-under" method is very large. For example, a 4 level signal, representing 2 bits/sample, can be hidden under an analog signal that has been reduced by a factor of at least 4, or 12 db. For a 6-MHz channel in which one-third of the capacity is used for the lows, this comes to 16 Mb/sec. In actual practice, this probably would have to be reduced somewhat. Even using only one sample per cycle—half the Nyquist rate—and one bit/sample would provide a capacity of 4 Mb/sec. Particularly in cable applications where the CNR at all receivers exceeds a certain minimum value, this extra capacity could be used for many different purposes. In broadcast applications, however, the result would be a loss of reception in those fringe areas where the CNR falls below the values required for proper separation of the two signals.

Digital Transmission of the Lows: Since the favorable results of scrambling and adaptive modulation can only be obtained with high-frequency components that are small in blank areas, the signal components that do not have this property must be noise-reduced and freed of frequency distortion by other methods, of which the most appropriate is digital transmission. While digital transmission requires additional channel capacity, the penalty is not so great in this arrangement since only a very small proportion of the original video signal must be so treated. Most of the signal can be transmitted with no bandwidth expansion at all by the methods described herein. Frequency modulation, another technique that trades widened bandwidth for increased SNR, could be substituted for digital transmission.

Receiver compatibility is not required for use in cable or other nonbroadcast applications, and in that case, all of the methods described can be freely used to design a system with maximum quality for the bandwidth and power available. Such a system could ultimately be used for broadcasting as well, in which case it would not only give much higher quality than NTSC within the present 6-MHz channels, but also would have better performance under the (typical) degraded channel conditions.

Systems having such good performance at low CNR raise another interesting possibility. Since the system results in much higher quality at a given SNR than NTSC, it is possible to operate at much lower ratios of desired to undesired levels. It may therefore be possible to transmit independent EDTV signals in the existing "taboo" channels at such low power that no unacceptable interference would result. A "taboo" channel is one that cannot be used at present in a given city because of interference with existing NTSC stations.

Other features and advantages of the invention are apparent from the following description of a preferred embodiment, and from the claims.

DESCRIPTION OF THE PREFERRED EMBODIMENT

Figure 1:
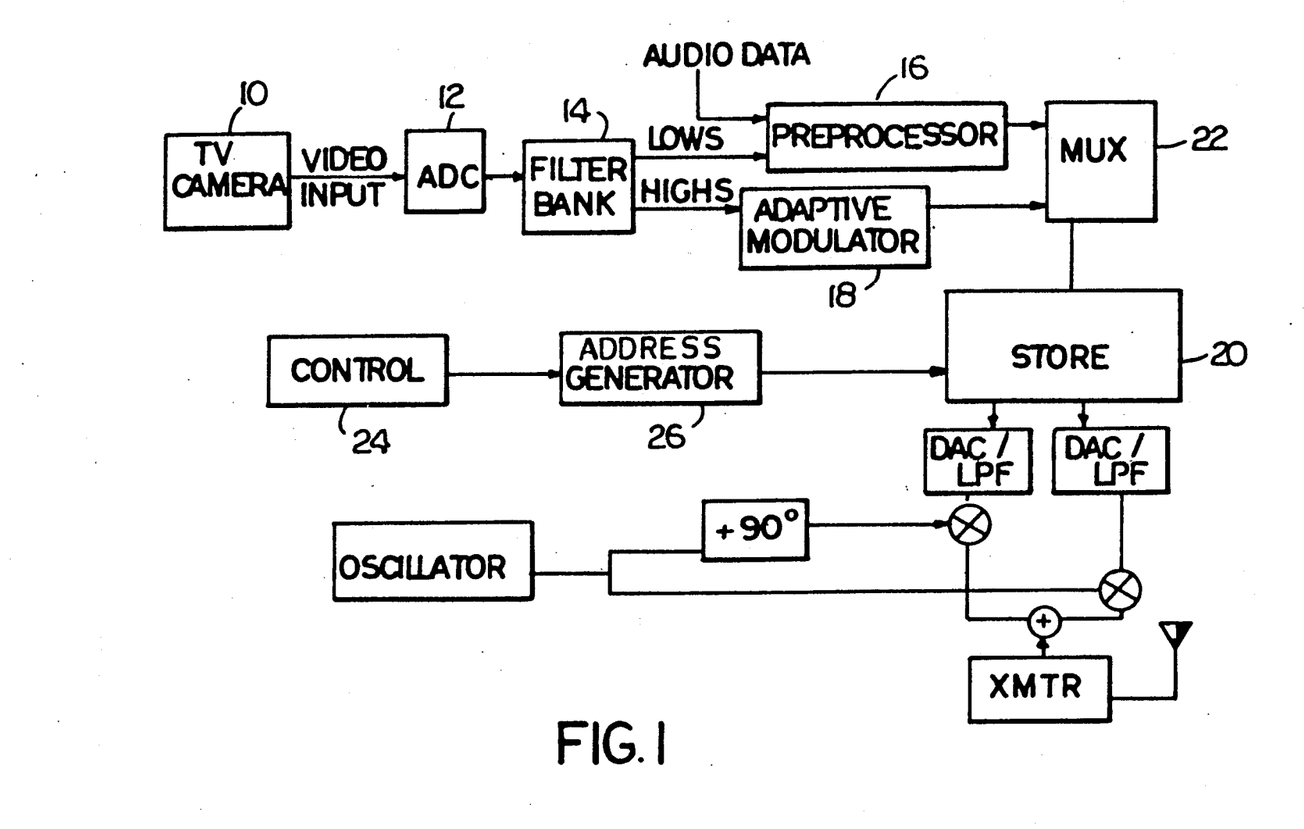
FIG. 1 is a diagram of the preferred embodiment of an encoder according to the invention.

As shown in FIG. 1, a video signal, received from a TV camera 10 (or VTR, or production system) is digitized by ADC 12 and passed to filter bank 14, which separates the signal into a number of spatiotemporal components. Those containing a dc value (the "lows") are separated from those that do not (the "highs"). The former typically are red, green, and blue video signals representing the dc and low spatial and temporal frequency components that cannot be advantageously adaptively modulated. These are transmitted to the preprocessor 16, where they are combined with audio and data signals that are to be transmitted along with the image signals, and subjected to a coding process, preferably implemented digitally. The objective of the coding process is to prepare these signals for digital or FM transmission using the smallest amount of data feasible considering the quality of the analog transmission link to be employed. Any known method of encoding may be used, such as pulse code modulation (PCM), differential PCM, transform coding, vector coding, etc. In the case of FM, the encoding process is preferably implemented digitally, resulting in a digital data stream that, when put into analog form, becomes a correct frequency modulated signal.

The lows components produced by the filter bank and that do not contain a dc component, are processed in the adaptive modulator 18 so that their levels are generally made as high as possible without channel overload. W. F. Schreiber et al., "Channel-Compatible 6-MHz HDTV Distribution System," presented at SMPTE Conference, Nashville, Jan. 29, 1988. In that method, x, y, t signal space is divided into blocks, e.g., 4×4×4 pels in size. Within each block, an adaptation factor is found. The block factors are transmitted to the receiver in the data channel. At both transmitter and receiver, the factor actually used at each pel is found from the block factors by interpolation, so that the factor used varies smoothly from pel to pel, thus avoiding block effects.

The adaptively modulated highs components and the other processed components are entered into the store 20, which holds at least one frame of information, via the multiplexer 22. The components that are used and the locations where the data is entered are selected by the multiplexer under direction of the control unit 24 and address generator 26. All the samples to be used in one frame must be stored and read out for transmission within one frame duration. The control unit 24 also serves to control operation of the other blocks in the encoder.

For transmission, data is read out of storage in two related data streams and converted to analog form. The two signals are then quadrature modulated onto a single carrier. The transmitter is simply a frequency shifter and linear video amplifier, as it is essential that the emitted signal be a faithful frequency-shifted version of the encoder output signal.

In the case of signals intended for transmission in the usual 6-MHz TV channel, the output signals from the store are each nominally 6 Megasamples/sec, so that the bandwidth of each analog signal is 3 MHz.

Scrambling of the data is achieved by generating a suitable sequence of addresses in the address generator during the readout process. A pseudorandom rather than a truly random process is desired, since the sequence of addresses must be known at the receiver. Well known techniques may be used for this purpose. It has been found that a simplification may be used in the implementation of the scrambler that gives sufficient scrambling, in which the column addresses are pseudorandomly shuffled independently of the row addresses. Thus the rows may be read out at random using randomly rearranged column addresses.

For minimum visibility of the noise and for encryption purposes, it must be possible to choose the random sequences used on successive frames arbitrarily from a large repertory of possible sequences. Since each sequence can be characterized by a very short generating function, L. G. Roberts, "Picture Coding Using Pseudorandom Noise," IRE Trans. on Information Theory, Vol. 8, No. 2, Feb. 1962, pp. 145-154, all that is required to accomplish this is to label each sequence with a number, to store a table of numbers and corresponding generating functions at both encoder and decoder, and to transmit in the data channel, for each frame, the number designating which sequence is used. Alternatively, the randomized starting address of a single random sequence can be stored in the table. The table itself may be changed from time to time for encryption purposes.

A close relationship is desirable between the two signals to be quadrature modulated so that, in case of a phase error in demodulation, a relatively minor effect on the image should result. This can be accomplished by dividing the store into two units (at least conceptually), each containing the data from half of the scanning lines, interleaved. Readout from the two halves of storage is identical, so that vertically adjacent picture elements are transmitted simultaneously by the two channels. Demodulation errors therefore manifest themselves as a crosstalk between vertically adjacent pels, or a small loss of vertical resolution.

Figure 2:
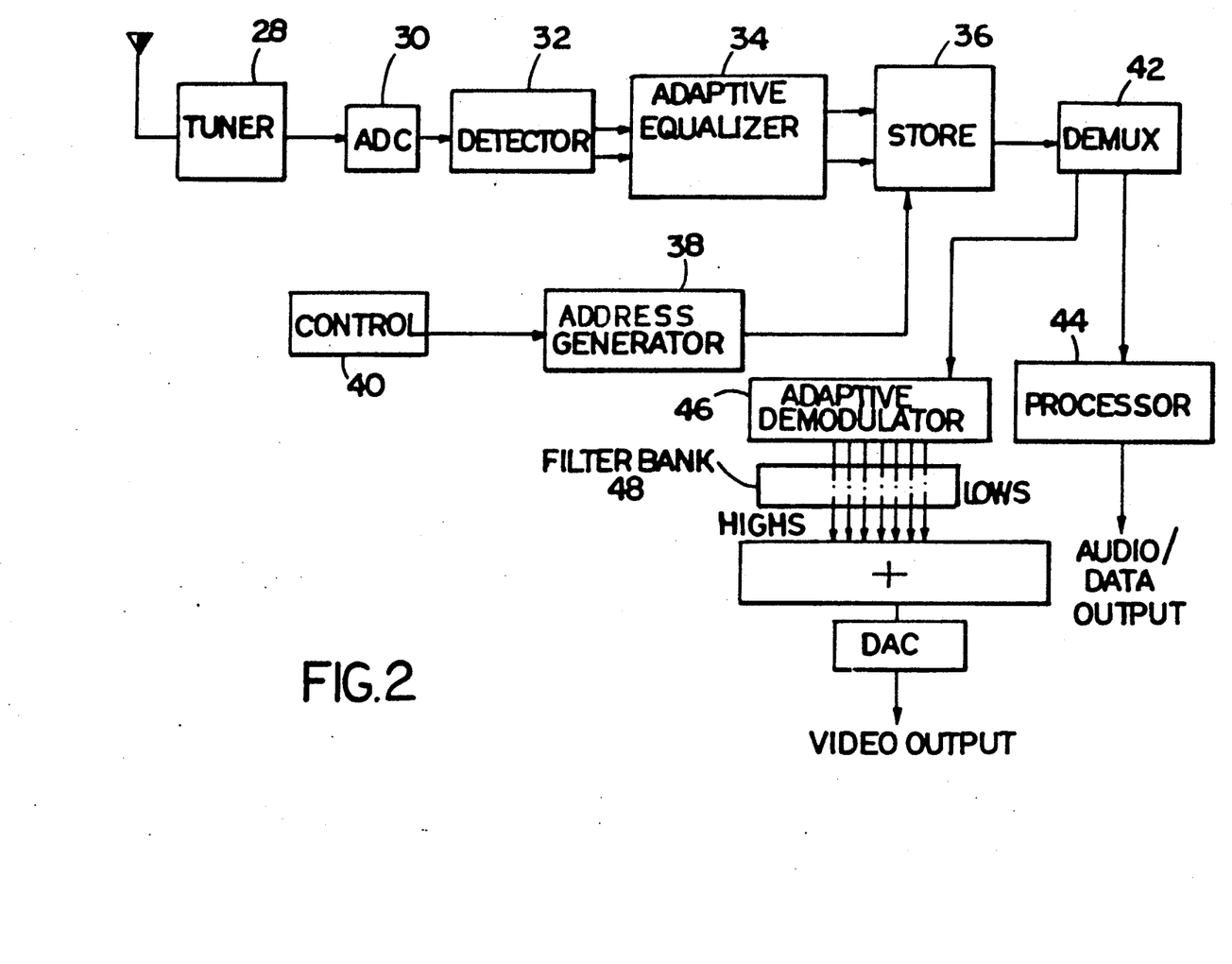
FIG. 2 is a diagram of the preferred embodiment of a decoder according to the invention.

Referring now to FIG. 2, the operation of the decoder can be explained. The radio frequency signal picked up by the antenna or transmission line is passed through a tuner 28 which preferably shifts the spectrum of the selected transmission to as low a frequency range as possible. For example, in a 6-MHz transmission, this range might be 2 to 8 MHz. The resulting signal is digitized at ADC 30 and passed to a digital detector 32, which recovers the two 3-MHz baseband signals originally impressed on the carrier, but corrupted by channel effects. These signals are input to the automatic equalizer 34, which compensates for the frequency response of the channel as well as any nonlinear distortion as discussed previously.

The corrected signals are entered in the store 36 in the locations determined by the address generator 38, supervised by control 40 (which also controls the other blocks of the decoder). It is at this point that descrambling is performed, and for this purpose, the particular pseudorandom pattern in each frame must be known to the control unit. From the store 36 the signals are read out from the locations determined by the address generator 38. The demultiplexer 42 separates the data corresponding to the dc and low-frequency components, from that corresponding to the high-frequency components. The former is decoded by the processor 44 to produce the lows component and the audio/data signal. The latter is decoded by demodulator 46 and interpolated in the filter bank 48 to produce the various high-frequency components. The highs and lows are now added together to produce the video output signal, which approximates the system video input.

Where compatibility and interference are not problems, but it is desired to achieve the best possible performance under a variety of channel conditions, it is clear that it is the audio and low-frequency components (including chrominance) that must be protected to the greatest extent. In such systems, it appears desirable to transmit these components digitally. Using one bit per sample, it should be possible to transmit at least 6 Mbits/sec and possibly as much as 12 Mbits/sec in the "data-under" channel. This information would be essentially noiseless. The highs components should be completely free of the effects of channel degradation at a CNR of about 36 db.

An analog signal of 6-MHz bandwidth added to the 2-level digital signal is equivalent to 12 Megasamples/sec. If 20 highs components are used, each at 12 frames/sec, each such component can use 600 Kilosamples/sec and thus has a resolution of 166 pels/picture-height by 300 pels/picture-width. The resulting luminance resolution ranges from 664×1200 at 12 fps to 166×300 at 60fps. Chrominance is 166×300 at 12 fps. The resolution at 36 fps is 332×600, substantially higher than NTSC. A CNR of about 36 db would be required for essentially noiseless reception.

Note that overall response of the compatible system is slightly inferior to that of the noncompatible system in spite of the fact that the former uses 9 MHz overall and the latter uses 6 MHz. In addition, the noncompatible signal may be used at low CNR, while in the compatible system, a low CNR can only be used for the augmentation channel. The NTSC channel requires the usual high CNR for good quality pictures. This shows the high price that must be paid for NTSC receiver compatibility.

Where it is desired to transmit in the "taboo" channels of the UHF and VHF bands without causing unacceptable interference to existing stations, the scheme proposed by Zenith can be used. In that scheme, all nearby stations are synchronized at least well enough so that their vertical blanking intervals are simultaneous. The digital components are transmitted as multilevel signals in this interval, while the analog highs signals are transmitted at very low level during the active portion of the NTSC fields. Assuming that the audio and lows components could be transmitted in, say, 10% of the field time, the resulting linear resolution would be about 5% less than in the example quoted above. No more than 24 db SNR, and possibly less, would be required for essentially noise-free reception.

Receiver-compatible systems using a 3-MHz augmentation channel have been proposed by W. E. Glenn et al., "High Definition Television Compatible Transmission System," IEEE Trans. on Broadcasting, Vol. BNC-33, No. 4, Dec. 1987, pp. 107-115 and "Hierarchical High Definition Television System Compatible with the NTSC Environment," North American Philips Corporation, Briarcliff Manor, N.Y., Sept. 1987. The advantage over systems that hide enhancement information within the NTSC signal is that the normal signal is completely unaltered, guaranteeing compatibility. Of course, more channel space is required. The methods discussed above permit a very substantial quality improvement with a very low power auxiliary channel.

The NTSC luminance bandwidth is limited to 3 MHz and the chrominance bandwidth to 0.6 MHz. While this may reduce resolution slightly on today's high-end receivers, it completely eliminates cross effects and provides a good base signal for enhancement. Additional spectral components are transmitted in a 3-MHz augmentation channel, some at 30 frames/sec and some at 15 frames/sec. These are added to the signal transmitted in the normal channel to produce an enhanced-definition picture on a special receiver. About 24 db CNR, possibly less, is required to make these additional components appear virtually noise-free when adaptive modulation and scrambling are used.

At a CNR of about 36 db, it should prove possible to superimpose these enhancement components on a 2-level digital signal and achieve an additional transmission rate of at least 3 Megabits/sec. This would permit a very high quality audio signal to be added, as well as a large amount of data. Of course, the digital channel could also be used for additional resolution enhancement.

It has been demonstrated that it is possible to reduce the frame rate of chrominance to 15 fps without causing any perceptible effect. W. J. Butera, "Multiscale Coding of Images," M.S. Thesis, Media Arts & Sciences, MIT, Sept. 1988. The resulting spectral "hole" can be used to double horizontal chrominance resolution, a highly desirable result.

Other embodiments are within the scope of the following claims.

I claim:

1. A television system for processing and transmitting a production television signal (e.g., a signal originating in a television camera or production facility), said system comprising an encoder with means for generating one or more pseudorandom sequences and with scrambling means for using said pseudorandom sequences to scramble the order in which individual picture elements of said signal are transmitted, wherein said encoder further comprises spectrum-dividing means for dividing said signal (spatially or spatiotemporally) into a plurality of frequency components and wherein said scrambling means operates on less than all of said frequency components.

2. The television system of claim 1 wherein said system further comprises a decoder with means for generating pseudorandom sequences identical to said pseudorandom sequences used in said encoder and with descrambling means for descrambling said picture elements using said identical pseudorandom sequences.

3. The television system of claim 1 wherein said plurality of frequency components includes at least one low-frequency component and at least one high-frequency component, and wherein said scrambling means operates only on said high-frequency components.

4. The television system of claim 3 further comprising means for transmitting said low-frequency component without scrambling.

5. The television system of claim 4 further comprising means for transmitting said low-frequency component digitally.

6. The television system of claim 4 further comprising means for transmitting said low-frequency component by frequency modulation.

7. The television system of claim 3 further comprising means for adaptively modulating said high-frequency component prior to scrambling to give greater relative amplification to areas in which said high-frequency component has lower values (e.g., generally blank areas of said image).

8. The television system of claim 7 wherein said system further comprises a decoder having means for generating pseudorandom sequences identical to said pseudorandom sequences used in said encoder, descrambling means for descrambling said high-frequency component using said identical pseudorandom sequences, and means for adaptively demodulating said component after descrambling.

9. The television system of claim 1 wherein said means for generating said pseudorandom sequence includes means for using different said pseudorandom sequences over time (e.g., on successive image frames).

10. The television system of claim 3 further comprising means for independently scrambling horizontal and vertical picture element addresses in said high-frequency component using independent pseudorandom sequences.

11. The television system of claim 3 wherein said spectrum dividing means includes means for dividing said signal into a plurality of spatiotemporal components, and wherein there are a plurality of said high-frequency components, each representative of a high-frequency spatiotemporal component of said signal.

12. The television system of claim 11 further comprising means for adaptively modulating said high-frequency components prior to scrambling to give greater relative amplification to areas in which said high-frequency components have low values (i.e., generally blank areas of said image).

13. The television system of claim 1 further comprising adaptive-equalization means for adaptively equalizing the channel across which said signal is transmitted.

14. The television system of claim 7 further comprising adaptive-equalization means for adaptively equalizing the channel across which said signal is transmitted.

15. A method of transmitting a television signal in which discrimination against frequency distortion is provided by pseudorandomly scrambling less than all of the television signal before transmission and descrambling the received signal, wherein the step of scrambling involves rearranging the order in which information in the television signal is transmitted.

16. The method of claim 15 wherein less than all of the image portion of the television signal is scrambled.

17. The method of claim 16 wherein said high-frequency components are adaptively modulated prior to scrambling to give greater relative amplification to picture areas in which said component is lower.

18. The method of claim 17 wherein said high frequency components are descrambled at a decoder and then adaptively demodulated.

19. The method of claim 18 wherein discrimination against multipath distortion and interference from other transmissions is provided by said scrambling.

* * * * *

UNITED STATES PATENT AND TRADEMARK OFFICE
CERTIFICATE OF CORRECTION

PATENT NO. : 5,040,211

DATED : August 13, 1991

INVENTOR(S) : William F. Schreiber

It is certified that error appears in the above-identified patent and that said Letters Patent is hereby corrected as shown below:

Col. 4, line 35, "rando" should be --randomized--.

Col. 7, line 16, "pulse code" should be --pulse-code--.

Col. 8, line 32, "radio frequency" should be --radio-frequency--.

Col. 11, line 8, "picture element" should be --picture-element--.

Signed and Sealed this

Sixteenth Day of March, 1993

Attest:

STEPHEN G. KUNIN

*Attesting Officer*   Acting Commissioner of Patents and Trademarks